(12) United States Patent
Tohda et al.

(10) Patent No.: US 9,258,515 B2
(45) Date of Patent: Feb. 9, 2016

(54) IMAGE DISPLAY DEVICE

(71) Applicant: JVC KENWOOD Corporation, Yokohama-shi (JP)

(72) Inventors: Motoshi Tohda, Kanagawa (JP); Isao Kaneno, Kanagawa (JP); Yuji Tanaka, Kanagawa (JP); Tatsuya Sato, Kanagawa (JP); Tatsuru Kobayashi, Kanagawa (JP); Manabu Kobayashi, Saitama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 14/476,719

(22) Filed: Sep. 3, 2014

(65) Prior Publication Data
US 2014/0368745 A1 Dec. 18, 2014

Related U.S. Application Data

(63) Continuation of application No. PCT/JP2013/003574, filed on Jun. 6, 2013.

(30) Foreign Application Priority Data

Jun. 29, 2012 (JP) .................................. 2012-148049

(51) Int. Cl.
*G02B 27/00* (2006.01)
*H04N 7/18* (2006.01)
(Continued)

(52) U.S. Cl.
CPC .............. *H04N 5/7458* (2013.01); *B60K 35/00* (2013.01); *G02B 27/01* (2013.01); *G02B 27/0101* (2013.01); *G03B 21/2066* (2013.01); *B60K 2350/2052* (2013.01)

(58) Field of Classification Search
CPC .... G02B 27/017; G02B 27/01; G02B 27/012; G02B 27/0101; G06T 19/006
See application file for complete search history.

(56) References Cited

U.S. PATENT DOCUMENTS

| | | | | |
|---|---|---|---|---|
| 2003/0165025 A1* | 9/2003 | Eberhardt | .......... | G02B 27/0149 359/871 |
| 2005/0156815 A1* | 7/2005 | Aoki | .................. | G02B 27/0101 345/7 |

(Continued)

FOREIGN PATENT DOCUMENTS

| | | |
|---|---|---|
| JP | H04-040270 U | 4/1992 |
| JP | 05-229366 A | 9/1993 |

(Continued)

OTHER PUBLICATIONS

International Search Report issued in PCT International Application No. PCT/JP2013/003574 dated Jul. 23, 2013.
(Continued)

*Primary Examiner* — Victor Kostak
(74) *Attorney, Agent, or Firm* — Venable LLP; Michael A. Sartori

(57) ABSTRACT

An image display device includes: an image generation unit that generates image display light based on an image signal; a projection unit that projects the image display light generated by the image generation unit; a combiner that presents the image display light projected by the projection unit as a virtual image; and a rotating unit that rotationally moves the combiner along at least one rotation surface, wherein the projection unit changes a direction in which the image display light is projected based on the rotational movement of the combiner.

3 Claims, 6 Drawing Sheets

(51) Int. Cl.
*H04N 5/74* (2006.01)
*B60K 35/00* (2006.01)
*G02B 27/01* (2006.01)
*G03B 21/20* (2006.01)

(56) References Cited

U.S. PATENT DOCUMENTS

| | | | | |
|---|---|---|---|---|
| 2005/0259301 | A1* | 11/2005 | Aoki | G02B 27/0149 359/13 |
| 2012/0299764 | A1* | 11/2012 | Haneda | G01S 17/42 342/54 |
| 2012/0313850 | A1* | 12/2012 | Ishida | G02B 27/01 345/156 |
| 2012/0313909 | A1* | 12/2012 | Ishida | G02B 26/101 345/207 |
| 2013/0258431 | A1* | 10/2013 | Guidi | B60K 35/00 359/13 |

FOREIGN PATENT DOCUMENTS

| | | |
|---|---|---|
| JP | 10-278629 A | 10/1998 |
| JP | 2010-208565 A | 9/2010 |
| JP | 4847627 B1 | 12/2011 |
| JP | 2012-071825 A | 4/2012 |

OTHER PUBLICATIONS

International Preliminary Report on Patentability issued in PCT International Application No. PCT/JP2013/003574 dated Dec. 31, 2014.

Notification of Reasons for Refusal in Japanese Patent Application No. 2012-148049, dated Nov. 10, 2015.

* cited by examiner

| PARTS NAME | ROTATION ANGLE | SPEED REDUCTION RATIO |
|---|---|---|
| COMBINER | θ° | 1 |
| FIRST PROJECTION MIRROR | 1/2 θ° | 1/2 |
| SECOND PROJECTION MIRROR | θ° | 1 |
| THIRD PROJECTION MIRROR | θ° | 1 |
| INTERMEDIATE IMAGE SCREEN | θ° | 1 |

IMAGE DISPLAY DEVICE

BACKGROUND

1. Field of the Invention

The present invention relates to an image display device and, more specifically, to an image display device that is capable of appropriately changing a direction in which a virtual image is presented to a user.

2. Description of the Related Art

In recent years, so-called head up displays that use LEDs or semiconductor laser light sources have been developed as image display devices. Head up displays are provided with an optical element called combiner. This combiner allows light that enters from outside a vehicle to pass through and displays to a user, as a virtual image, an image related to image display light that is projected. Via this combiner, the user is able to recognize the virtual image while overlapping the virtual image on a landscape the user is actually viewing.

Head up displays such as those described above have received attention as display devices for vehicles in recent years since the head up displays allow a driver to recognize a landscape outside the vehicle and image displaying various types of information almost without changing the line of sight or a focal position of the eyes. Also, technological development has been actively made for presenting an appropriate virtual image in a visual-line direction of a driver or the like.

For example, Patent document No. 1 suggests a method that allows a virtual image to be recognized even when the position of the eyes of the driver changes in the upward and downward directions by adjusting the angle of a mirror that projects an image onto a combiner. Patent document No. 2 suggests a method of adjusting the angle of a combiner and an entire image generation unit in an integral manner.

[Patent document No. 1] Japanese Unexamined Patent Publication No. 5-229366

[Patent document No. 2] Japanese Patent No. 4847627

Various limitations on a mounting position and a size are required for head up displays. For example, head up displays that are mounted in a vehicle are required to be appropriately installable according to various types of vehicles. Even after installation, head up displays are also required to be able to appropriately present a virtual image even when, for example, there is a change in the position of eyes of a driver in accordance with the sitting height of the driver.

In the method suggested in Patent document No. 1 that adjusts the angle of a mirror that projects an image onto a combiner, the angle of a beam of light that is incident on the combiner is changed for the adjustment. Therefore, if the angle of a beam of light that is changed is large, an image that is recognized as a virtual image on the combiner may become distorted. Also, in a device suggested in Patent document No. 2, it can be expected that an increase in the size of the device for the adjustment of an angle causes a problem that the adjustment cannot be appropriately made in a vehicle with a limited space for installation or that the device cannot be installed in the first place.

SUMMARY

In this background, a purpose of the present invention is to provide an image display device that is capable of appropriately changing a direction in which a virtual image is presented to a user even in a limited space for installation.

A display device for a vehicle according to the present invention includes: an image generation unit that generates image display light based on an image signal; a projection unit that projects the image display light generated by the image generation unit; a combiner that presents the image display light projected by the projection unit as a virtual image; and a rotating unit that rotationally moves the combiner along at least one rotation surface, wherein the projection unit changes a direction in which the image display light is projected based on the rotational movement of the combiner.

According to the present invention, an image display device can be provided that is capable of appropriately changing a direction in which a virtual image is presented to a user even in a limited space for installation.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
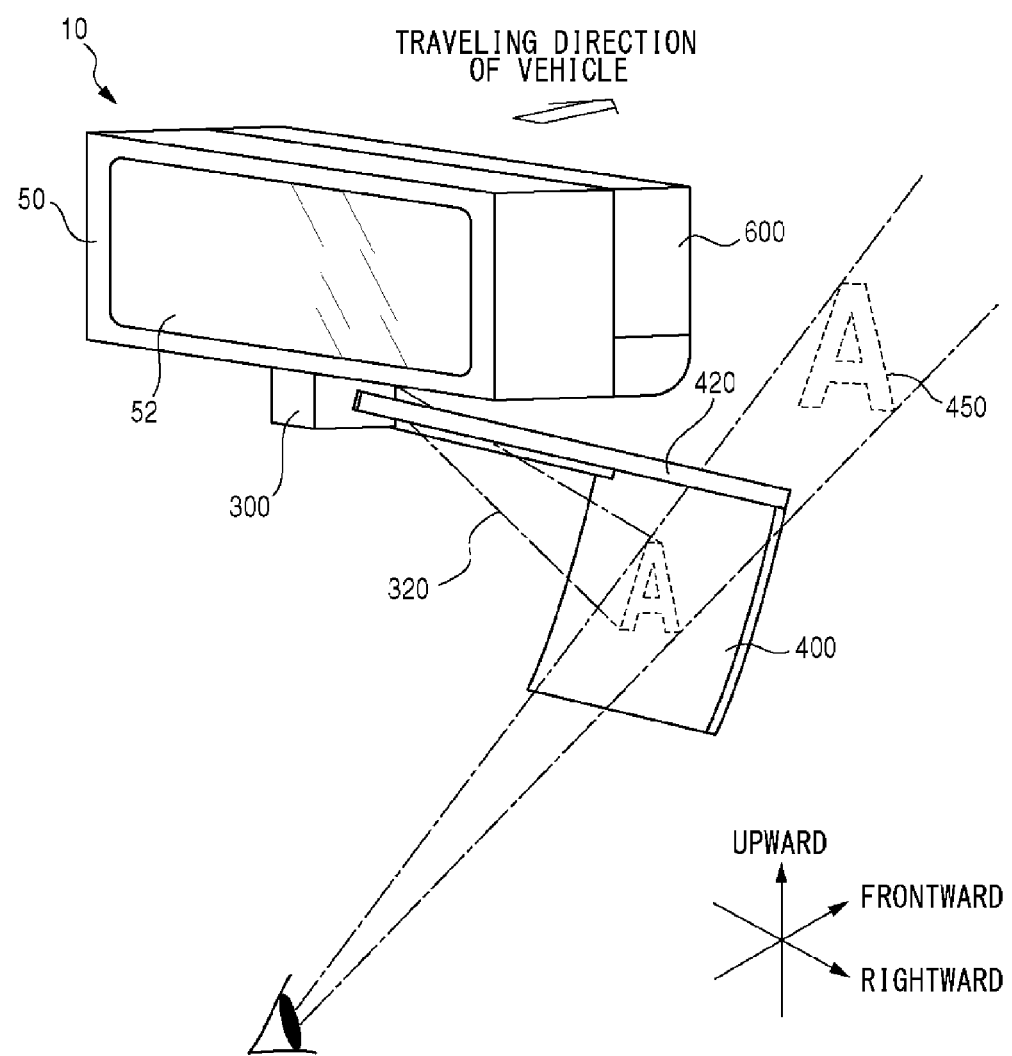
FIG. 1 is a perspective view of a head up display, which is a display device for a vehicle according to the present embodiment, shown from the inside of the vehicle.

Described below is an explanation of the embodiments of the present invention with reference to figures. Specific numerical values and the like shown in the embodiments are shown merely for illustrative purposes to facilitate understanding of the invention and do not intend to limit the scope of the present invention, unless otherwise noted. In the subject specification and figures, elements having substantially the same functions and structures shall be denoted by the same reference numerals, and duplicative explanations will be omitted appropriately. Also, the illustration of elements that are not directly related to the present invention is omitted.

[Whole Configuration]

In the following, a head up display for a vehicle is used as an example of an image display device, and the head up display is explained as an embodiment. FIG. 1 is a perspective view of a head up display 10 according to the present embodiment observed by means of a field of view directed from a rear-view mirror 600, to which this head up display 10 is attached, to a windshield (not shown) of a vehicle.

The head up display 10 is used while being attached to a mirror surface of the rear-view mirror 600 inside the vehicle by a holding mechanism or the like (not shown). A space that allows the head up display 10 to be mounted such as an area in the upward direction of a dashboard varies depending of the types of vehicles. A head up display 10 according to the present embodiment can be attached to a rear-view mirror.

Thus, the head up display 10 can be appropriately mounted regardless of the types of vehicles as long as a rear-view mirror 600 is provided.

In the following explanations, directions shown as forward, backward, leftward, rightward, upward, and downward are as described in the following. The directions shown as forward and backward represent a forward direction and a backward direction of a vehicle in which the head up display 10 is mounted, respectively. The directions shown as leftward and rightward represent a leftward direction and a rightward direction of the vehicle in which the head up display 10 is mounted, respectively. While each being a direction that is perpendicular to a road surface on which the vehicle, in which the head up display 10 is mounted, is placed, the directions indicated as upward and downward represent a direction to the side of the vehicle with respect to the road surface, and a direction that is opposite to the direction, respectively.

The head up display 10 generates an image signal related to an image displayed on a combiner 400 as a virtual image and is provided with a circuit substrate (not shown) that outputs the generated image signal. When an image signal output from an external device (not shown) such as a navigation device, a media reproduction device, or the like is input to the circuit substrate, the circuit substrate is also capable of outputting the image signal after performing a predetermined process on the signal that has been input.

The head up display 10 is provided with a light source 231, an image display element 240 such as a liquid crystal on silicon (LCOS), which is a reflection type liquid crystal display panel, and an image generation unit 50 including various optical lenses and the like for generating image display light based on the image signal output from the circuit substrate. In the present embodiment, a case where a liquid crystal on silicon (LCOS), which is a reflection type liquid crystal display panel, is used as the image display element 240 is illustrated for example. However, a digital micromirror device (DMD) may be used as the image display element 240. In that case, the DMD is assumed to be formed by an optical system and a drive circuit according to a display element to which the DMD is applied. The light source 231 and the image display element 240 will be described later in detail in reference to FIG. 2.

The head up display 10 includes an intermediate image screen on which a real image is formed and various projection mirrors and has a projection unit 300, which determines the projection direction of image display light that is generated. Further, the head up display 10 has a combiner 400 having an approximate concave shape for displaying projected image display light as a virtual image 450 and a combiner support arm 420 connecting the combiner 400 and the projection unit 300. The image generation unit 50 is provided with an alternative mirror 52 used as an alternative to a mirror part of a rear-view mirror on a surface thereof on the side of the driver, taking a role of the rear-view mirror. In FIG. 1, an optical path of image display light that is projected from the projection unit 300 and that reaches the combiner 400 is shown as a projection axis 320.

The combiner 400 is rotatable in upward and downward directions with respect to the image generation unit 50 by means of the combiner support arm 420. Also, the projection unit 300 is provided rotatably with respect to the image generation unit 50 in the leftward and rightward directions in an integral manner with the combiner 400. Therefore, by rotationally moving the projection unit 300, the combiner 400 can be rotationally moved by means of the combiner support arm 420. The configuration described above allows a user to adjust the direction of the combiner in accordance with the user's eye level or preference.

The image generation unit 50 is provided with the alternative mirror 52 used as an alternative to a mirror part of a rear-view mirror on a surface thereof on the side of the driver, and the alternative mirror 52 takes a role of the rear-view mirror 600 for checking in the backward direction. Even when the head up display 10 is mounted in such a manner that the head up display 10 covers the mirror part of the rear-view mirror 600, the user is able to drive while checking behind the vehicle using this alternative mirror.

[Optical System]

Figure 2:
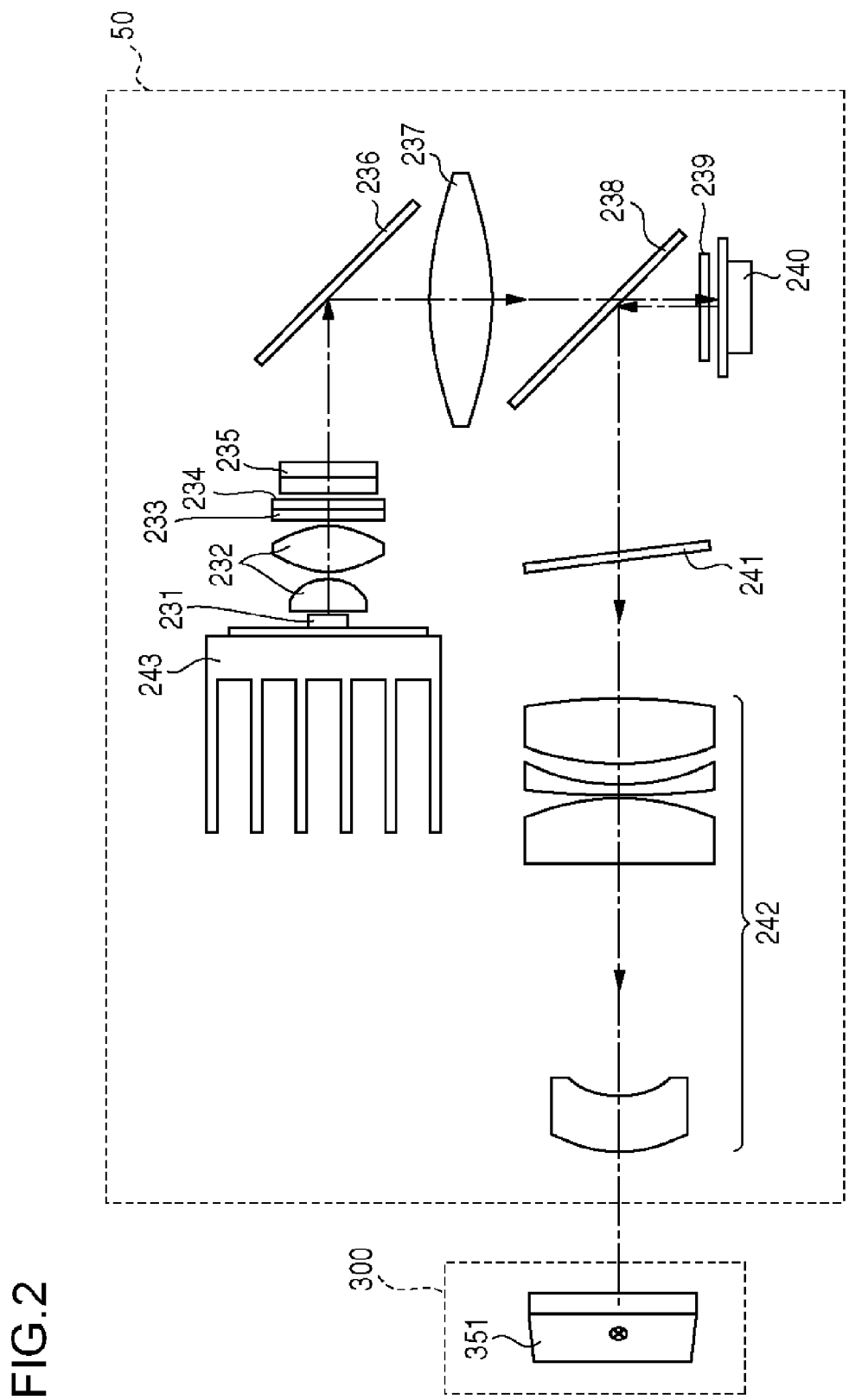
FIG. 2 is a diagram illustrating the internal configuration of an optical system of an image generation unit along with an optical path.
Figure 3:
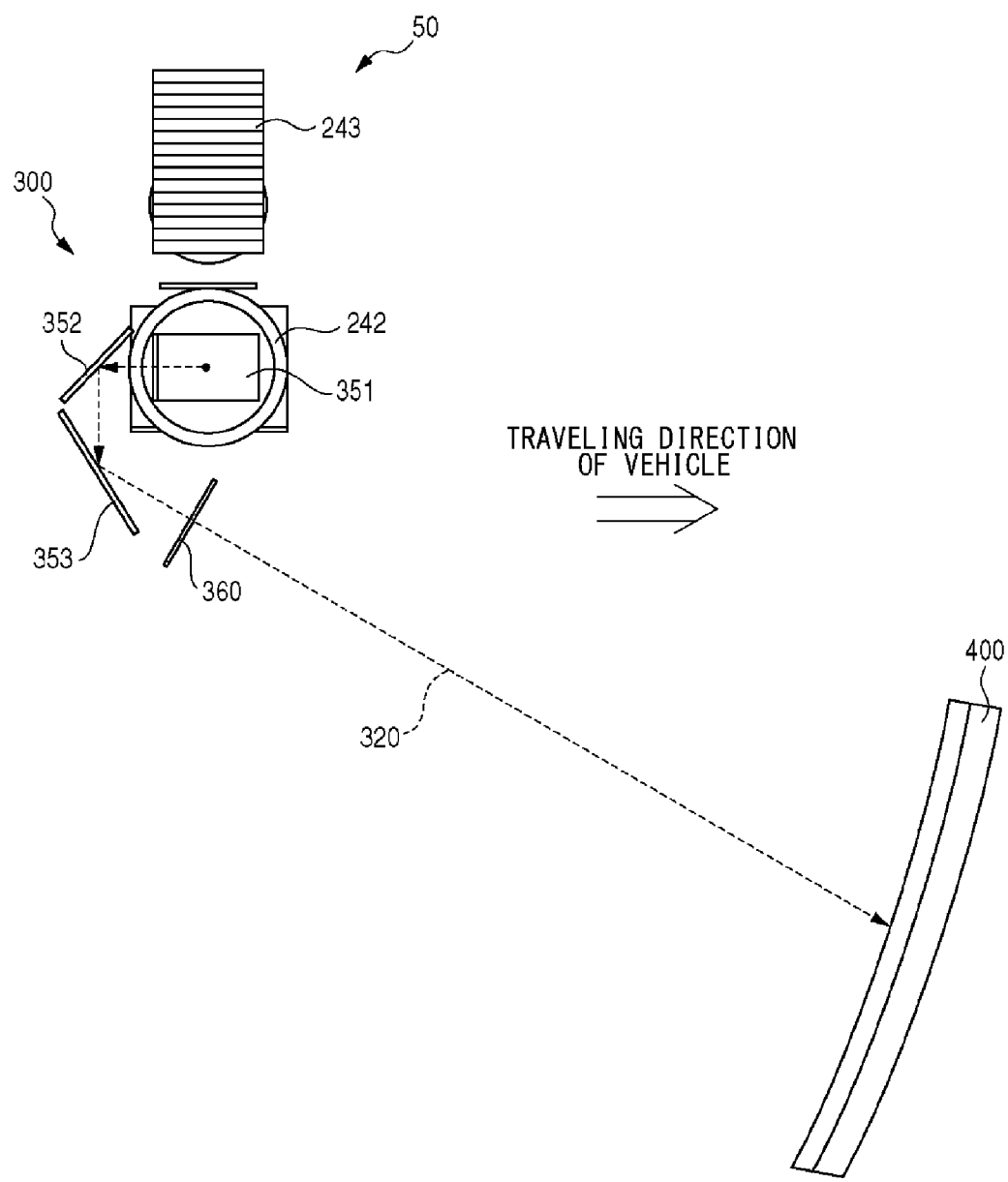
FIG. 3 is another diagram illustrating the internal configuration of the optical system of the image generation unit along with the optical path.

An explanation is now given regarding the internal configuration of the head up display 10. FIG. 2 and FIG. 3 are both diagrams illustrating the internal configuration of the image generation unit 50 along with an optical path. FIG. 2 is a diagram illustrating the internal configuration of the image generation unit 50 and a part of the internal configuration of the projection unit 300 along with an optical path. FIG. 3 is a diagram illustrating the internal configuration of the projection unit 300 and a part of the internal configuration of the image generation unit 50 along with an optical path of light projected onto the combiner 400.

First, in reference to FIG. 2, an explanation is given regarding the internal configuration of an optical system of the image generation unit 50 and an optical path related to image display light. The optical system of the image generation unit 50 is provided with a light source 231, a collimate lens 232, a UV-IR (UltraViolet-Infrared Ray) cut filter 233, a polarizer 234, a fly-eye lens 235, a reflecting mirror 236, a field lens 237, a wire grid polarization beam splitter 238, a quarter-wave plate 239, an image display element 240, an analyzer 241, a projection lens group 242, and a heat sink 243.

The light source 231 consists of a light-emitting diode that emits white light or light in three colors: blue, green, and red. The heat sink 243 for cooling heat generated along with emission of light is attached to the light source 231. Light emitted by the light source 231 is changed to parallel light by the collimate lens 232. The UV-IR cut filter 233 absorbs and removes ultraviolet light and infrared light from the parallel light passed through the collimate lens 232. The polarizer 234 changes light that has passed through the UV-IR cut filter 233 to P-polarized light without disturbance. The fly-eye lens 235 then adjusts the brightness of light that has passed through a polarization plate to be uniform.

The reflecting mirror 236 changes the optical path of light that has passed through each cell of the fly-eye lens 235 by 90 degrees. Light reflected by the reflecting mirror 236 is collected by the field lens 237. Light collected by the field lens 237 is radiated to the image display element 240 via the wire grid polarization beam splitter 238 and quarter-wave plate 239 that transmit P-polarized light.

The image display element 240 is provided with a color filter of a red color, a green color, or a blue color for each pixel. The light radiated to the image display element 240 is changed to a color that corresponds to each pixel, modulated by a liquid crystal composition provided on the image display element 240, and emitted toward the wire grid polarization beam splitter 238 while being S-polarized image display light. The emitted S-polarized image display light is reflected by the wire grid polarization beam splitter 238 and enters the projection lens group 242 after changing the optical path and passing through the analyzer 241.

The image display light transmitted through the projection lens group 242 exits the image generation unit 50 and enters the projection unit 300. A first projection mirror 351 provided on the projection unit 300 then changes the optical path of the entering image display light.

Subsequently, in reference to FIG. 3, an explanation is given regarding the internal configuration of the projection unit 300 and an optical path of image display light. The projection unit 300 is provided with the first projection mirror 351, a second projection mirror 352, a third projection mirror 353, and the intermediate image screen 360.

The optical path of the image display light that is bent at the first projection mirror 351 of the projection unit 300 is bent in the downward direction at the second projection mirror. The optical path of the image display light is then bent in a diagonally downward direction toward the forward direction of the vehicle at the third projection mirror 353 and then forms an actual image on the intermediate image screen 360. The actual image that is formed is projected onto the combiner 400 arranged in the forward direction along the projection axis 320. The driver visually recognizes an image based on the image display light projected onto the combiner 400 as a virtual image while the virtual image is superimposed on a landscape.

As described above, the projection unit 300 is formed such that the projection unit 300 is rotatable in the leftward and rightward directions with respect to the image generation unit 50. The combiner 400 is rotatable in the upward and downward directions with respect to the projection unit 300. Further, the projection unit 300 is provided with a rotation mechanism (not shown) such as a gearbox or the like, and this gearbox rotationally moves the first projection mirror 351, the second projection mirror 352, the third projection mirror 353, and the intermediate image screen 360 in accordance with the rotational movement of the projection unit 300 or the combiner 400. A detailed description will be made later regarding the rotational movement of the first projection mirror 351, the second projection mirror 352, the third projection mirror 353, and the intermediate image screen 360.

Figure 4:
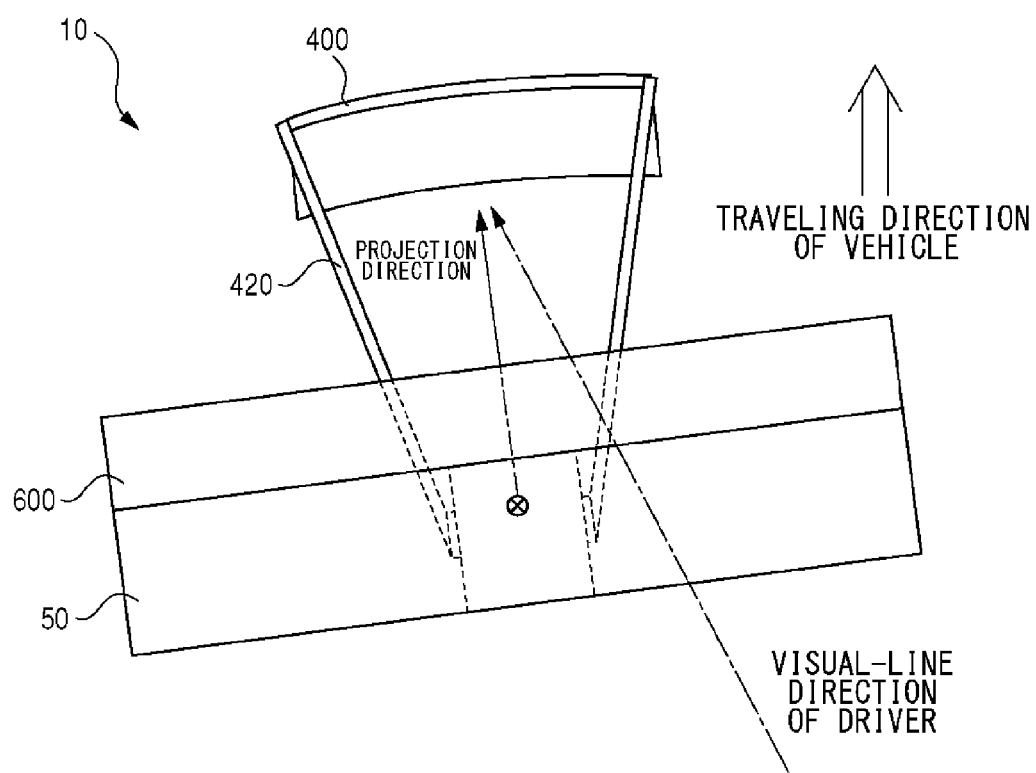
FIG. 4 is a top view of the head up display attached to a rear-view mirror.

FIG. 4 is a top view for explaining the head up display 10 attached to the rear-view mirror 600. In this figure, the combiner 400 is not tilted toward the driver with respect to the rear-view mirror 600. The projection direction of image display light from the projection unit 300 to the combiner 400 is deviated from the visual-line direction of the driver (user) viewing the combiner 400 at this time. Therefore, image display light emitted from the projection unit 300 is reflected by the combiner 400, and a visually-recognizable area where the user is able to recognize a virtual image based on the image display light is deviated from the position of the eyes of the driver. Thus, the driver cannot visually recognize the virtual image based on the image display light appropriately in this case. In particular, the direction of the rear-view mirror 600 with respect to the user for checking in the backward direction using reflected light does not usually match the direction of the combiner 400 with respect to the user, which needs to be adjusted in accordance with the visual-line direction of the user during driving.

The head up display 10 according to the present embodiment is formed such that, as well as the adjustment of only the direction of the combiner 400, the direction of image display light projected onto the combiner 400 based on the adjustment of the direction is appropriately adjusted so that the driver is able to visually recognize a virtual image based on the image display light appropriately. The configuration thereof is described in detail in the following.

Figure 5:
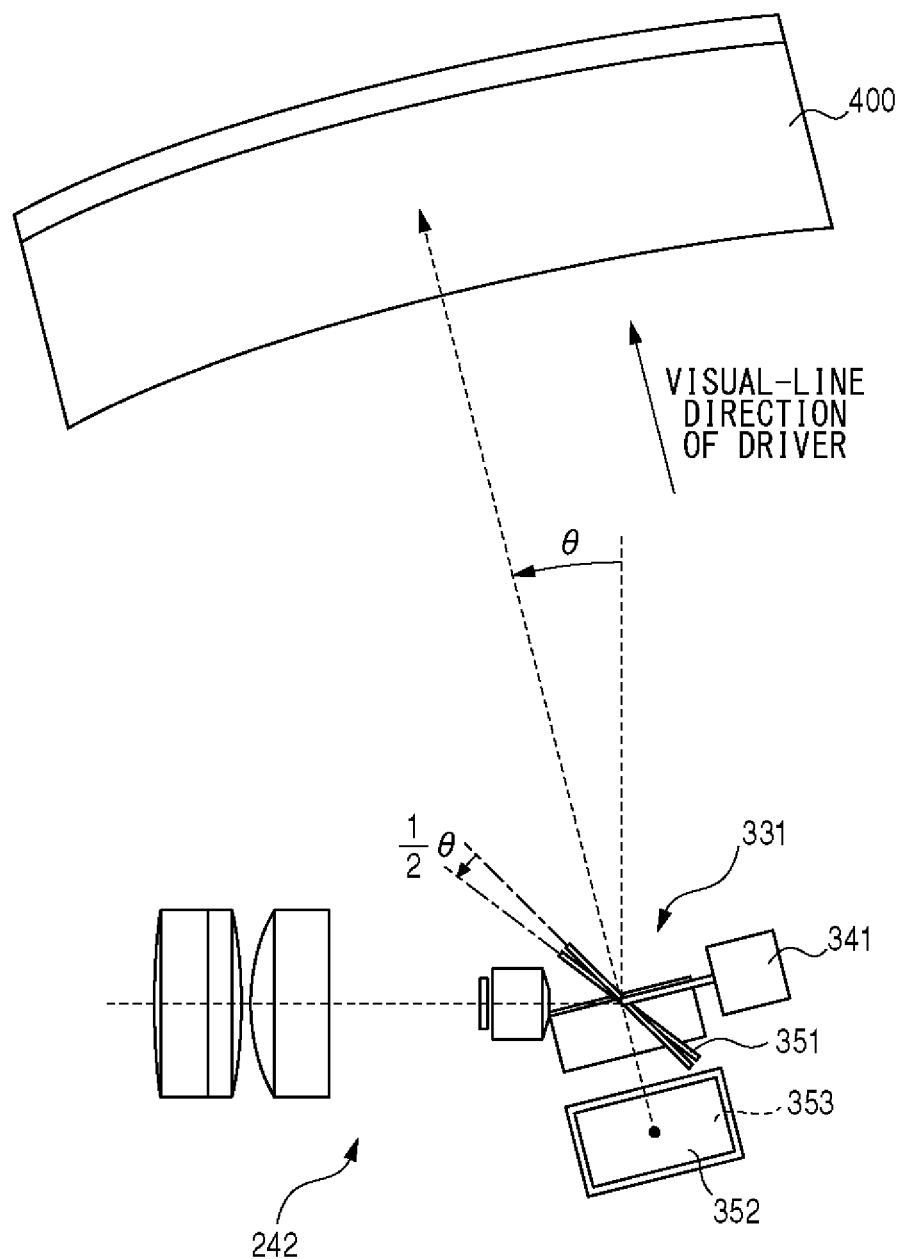
FIG. 5 is a diagram illustrating a part of the combiner and the optical system when the combiner is tilted toward a driver by an angle of θ.

FIG. 5 is a diagram illustrating a part of the combiner 400 and the optical system in a case where the head up display 10 is mounted on a right steering wheel vehicle and where the direction of the combiner 400 is changed in the leftward direction by an angle of θ. A plane that is perpendicular to a rotational movement axis of a rotating unit 331 used when the combiner 400 is rotationally moved in the leftward direction or the rightward direction is hereinafter referred to as a horizontal plane. A horizontal plane is a plane that is parallel to the bottom surface of a vehicle. Also, a plane that is perpendicular to a rotational movement axis used when the combiner 400 is rotationally moved in the upward direction or the downward direction is referred to as a vertical plane. A vertical plane is a plane that is parallel to a plane that is perpendicular to the bottom surface of a vehicle.

In a head up display attached to the rear-view mirror 600, depending on the direction of the rear-view mirror, there is a case where a horizontal plane does not become parallel to the bottom surface of the vehicle and a case where a vertical plane does not become perpendicular to the bottom surface of the vehicle. In order to facilitate explanations and understanding, an explanation is given in the following on the assumption that the horizontal plane is a plane that is approximately parallel to the bottom surface of the vehicle and that the vertical plane is a plane that is approximately parallel to a plane that is vertical to the bottom surface of the vehicle, in consideration of changes in the direction of the rear-view mirror such as the one described above for the adjustment of the combiner 400 when the head up display 10 is attached, when the rear-view mirror 600 is in a state where the optical axis of the mirror part thereof is parallel to the bottom surface of the vehicle and is also parallel to the traveling direction of the vehicle occurring when the steering is not being turned.

When the driver rotationally moves the combiner 400 by an angle of θ on the horizontal plane, the projection unit 300 rotationally moves by the angle of θ in the same direction with respect to the image generation unit 50 via the combiner support arm 420 not shown in FIG. 4. As a result, in accordance with this rotational movement of the projection unit 300, the second projection mirror 352, the third projection mirror 353, and the intermediate image screen 360 provided in the projection unit 300 rotationally moves along a plane that is parallel to the horizontal plane by the angle of θ using the same rotation axis and in the same direction as those for the rotational movement of the combiner 400. Each component is formed such that the rotational movement axis for these rotational movements passes through a reflection point of main light beam of the first projection mirror 351.

On the other hand, the first projection mirror 351 also provided in the projection unit 300 is adjusted by a first projection mirror gearbox 341, which is one of angle adjustment mechanisms, such that the first projection mirror 351 rotates along a plane that is parallel to the horizontal plane by an angle of θ/2 using the same rotation axis and in the same direction as those for the rotational movement of the combiner 400. This allows a relative positional relationship between the projection direction of image display light that heads to the combiner 400 after passing through the intermediate image screen 360 and the combiner 400 to be the same as a relative positional relationship occurring before the combiner 400 is rotationally moved. Therefore, even when the user rotationally moves the combiner 400 changing the direction of the combiner 400 with respect to the user, an image recognized as a virtual image on the combiner can be obtained as an image without distortion.

As described above, according to the head up display 10 according to the present embodiment, even when an installation space inside the vehicle is limited, the direction of the combiner 400 and the direction of image display light projected onto the combiner 400 can be adjusted without moving the entire device. Since the projection direction of image display light that is projected, as well as just the combiner 400, can be appropriately adjusted in the head up display 10, the user can visually recognize an appropriate image without distortion even after the adjustment.

Figures 6, 7:
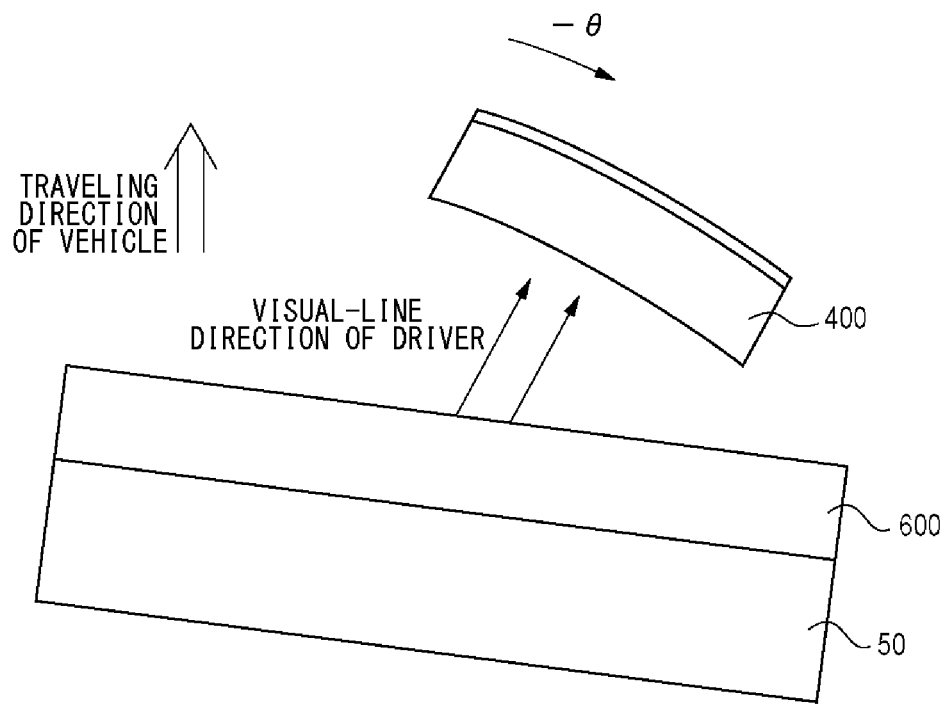
FIG. 6 is a table illustrating a relationship for a rotation angle and the like of each projection mirror when the combiner is tilted toward the driver by the angle of θ.
FIG. 7 is a diagram illustrating a case where the combiner is rotated by an angle of −θ for a left steering wheel vehicle.

FIG. 6 is a table showing a relationship between respective rotation angles and speed reduction ratios of the combiner 400, the first projection mirror 351, the second projection mirror 352, the third projection mirror 353, and the intermediate image screen 360 described above. As shown in this table, when the combiner 400 is rotated by the angle of θ on the horizontal plane, the first projection mirror 351 is rotated by the angle of θ/2, and the second projection mirror 352, the third projection mirror 353, and the intermediate image screen 360 are rotated by the angle of θ. By having a relationship between the rotation angle of the combiner 400 obtained when the direction thereof is changed by the user and the respective rotation angles of the projection mirrors and the intermediate image screen 360 as described above, the projection direction of image display light that is projected can be appropriately changed in accordance with a change in the direction of the combiner.

FIG. 7 is a diagram illustrating a part of the combiner 400 and the optical system in a case where the head up display 10 is mounted on a left steering wheel vehicle and where the direction of the combiner 400 is changed in the rightward direction by an angle of −θ. Even in this case, as in the case explained in FIG. 5 and FIG. 6, the first projection mirror 351 is rotationally moved by the angle of −θ/2, and the second projection mirror 352, the third projection mirror 353, and the intermediate image screen 360 are rotationally moved by the angle of −θ.

As described above, the head up display 10 is attached to a rear-view mirror provided between a driver's seat and a front passenger seat such that the combiner 400 can be rotationally moved on a horizontal plane, and the projection direction of image display light can be appropriately changed in accordance with the rotational movement. Therefore, an appropriate virtual image can be presented to both a user using the head up display 10 in a right steering wheel vehicle and a user using the head up display 10 in a left steering wheel vehicle.

Subsequently, an explanation is given regarding a case when the combiner 400 is rotationally moved on the vertical plane. The user can rotationally move the combiner 400 in the upward direction or the downward direction by means of the combiner support arm 420 described above. The combiner is rotationally moved on the vertical plane perpendicular to a rotational movement axis at this time. When the combiner 400 is rotationally moved by an angle of φ on the vertical plane, the second projection mirror, the third projection mirror, and the intermediate image screen 360 are rotationally moved on the same vertical plane by an angle of φ/2, the angle of φ, and the angle of φ, respectively, by the gearbox included in the projection unit 300. Each component is formed such that the same rotational movement axis is used for these rotational movements and for the rotational movement of the combiner 400, as in the case of the rotational movement on the horizontal plane.

Therefore, since the projection direction of image display light that is projected, as well as just the combiner 400, can be appropriately adjusted in the head up display 10, the user can visually recognize an appropriate image without distortion even after the adjustment. This allows the driver to recognize an appropriate virtual image without distortion even when there is a change in the eye level of the driver due to the sitting height or posture of the driver.

The rotation mechanism of the combiner 400 in the above-stated embodiment is shown merely for illustrative purposes, and any rotation mechanism may be employed as long as the rotation mechanism allows the combiner 400 to be rotationally moved on a horizontal plane or a vertical plane. Also, the rotation mechanism of each of optical elements such as the projection mirrors and the like explained in the above-stated embodiment is also shown merely for illustrative purposes, and any rotation mechanism may be employed as long as the rotation mechanism allows the projection direction of image display light onto the combiner can be changed based on the rotational movement of the combiner.

Further, in the above-stated embodiment, the rotational movement is assumed to occur on the horizontal plane and the vertical plane. However, as long as a mechanism is used that rotationally moves in each plane of a first plane and a second plane, which are two planes that intersect perpendicularly with each other, the angles for rotational movement of θ and φ described above can be applied.

What is claimed is:

1. An image display device comprising:
   an image generation unit that generates image display light based on an image signal;
   a projection unit that includes a first projection mirror that projects, in a first direction, the image display light generated by the image generation unit and a second projection mirror that projects, in a second direction that is perpendicular to the first direction, the image display light projected by the first projection mirror;
   a combiner that presents the image display light projected by the projection unit as a virtual image; and
   a rotating unit that rotationally moves the combiner along at least one rotation surface,
   wherein, when the rotating unit rotationally moves the combiner by an angle of θ along a rotation surface that is parallel to the first direction, the projection unit changes a direction in which the image display light is projected by rotationally moving the first projection mirror by an angle of (½)θ and rotationally moving the second projection mirror by the angle of θ.

2. The image display device according to claim 1, further comprising:
   a mount that is attached to a rear-view mirror of a vehicle,
   wherein the projection unit includes: a first projection mirror that projects, in a direction that is approximately parallel to a bottom surface of the vehicle, the image display light generated by the image generation unit; a second projection mirror that projects, in a direction that is perpendicular to the bottom surface of the vehicle, the image display light projected by the first projection mirror; and a third projection mirror that projects, in a direction toward the combiner, the image display light projected by the second projection mirror, and
   wherein, when the rotating unit rotationally moves the combiner by an angle of θ along a rotation surface that is approximately parallel to the bottom surface of the vehicle, the projection unit rotationally moves the first projection mirror by an angle of (½)θ, rotationally moves the second projection mirror by the angle of θ, and rotationally moves the third projection mirror by the angle of θ.

3. The image display device according to claim 1, further comprising:
   amount that is attached to a rear-view mirror of a vehicle,
   wherein the projection unit includes: a first projection mirror that projects, in a direction that is approximately parallel to a bottom surface of the vehicle, the image display light generated by the image generation unit; a second projection mirror that projects, in a direction that is approximately perpendicular to the bottom surface of the vehicle, the image display light projected by the first projection mirror; and a third projection mirror that projects, in a direction toward the combiner, the image display light projected by the second projection mirror, and wherein, when the rotating unit rotationally moves the combiner by an angle of $\theta$ along a rotation surface that is approximately perpendicular to the bottom surface of the vehicle, the projection unit rotationally moves the second projection mirror by the angle of $(\frac{1}{2})\theta$ and rotationally moves the third projection mirror by the angle of $\theta$ without rotationally moving the first projection mirror.

* * * * *